(No Model.)  
6 Sheets—Sheet 1.

F. F. LANDIS.
TRACTION ENGINE.

No. 268,808. Patented Dec. 12, 1882.

WITNESSES  
F. H. Knight  
F. C. Rose

INVENTOR  
F. F. Landis.  
By H. T. Abbot.  
ATTORNEY.

(No Model.)

6 Sheets—Sheet 2.

F. F. LANDIS.
TRACTION ENGINE.

No. 268,808.

Patented Dec. 12, 1882.

WITNESSES
F. H. Knight
F. C. Rose

F. F. Landis.
INVENTOR.
By H. J. Abbot
ATTORNEY.

(No Model.) 6 Sheets—Sheet 3.
F. F. LANDIS.
TRACTION ENGINE.
No. 268,808. Patented Dec. 12, 1882.
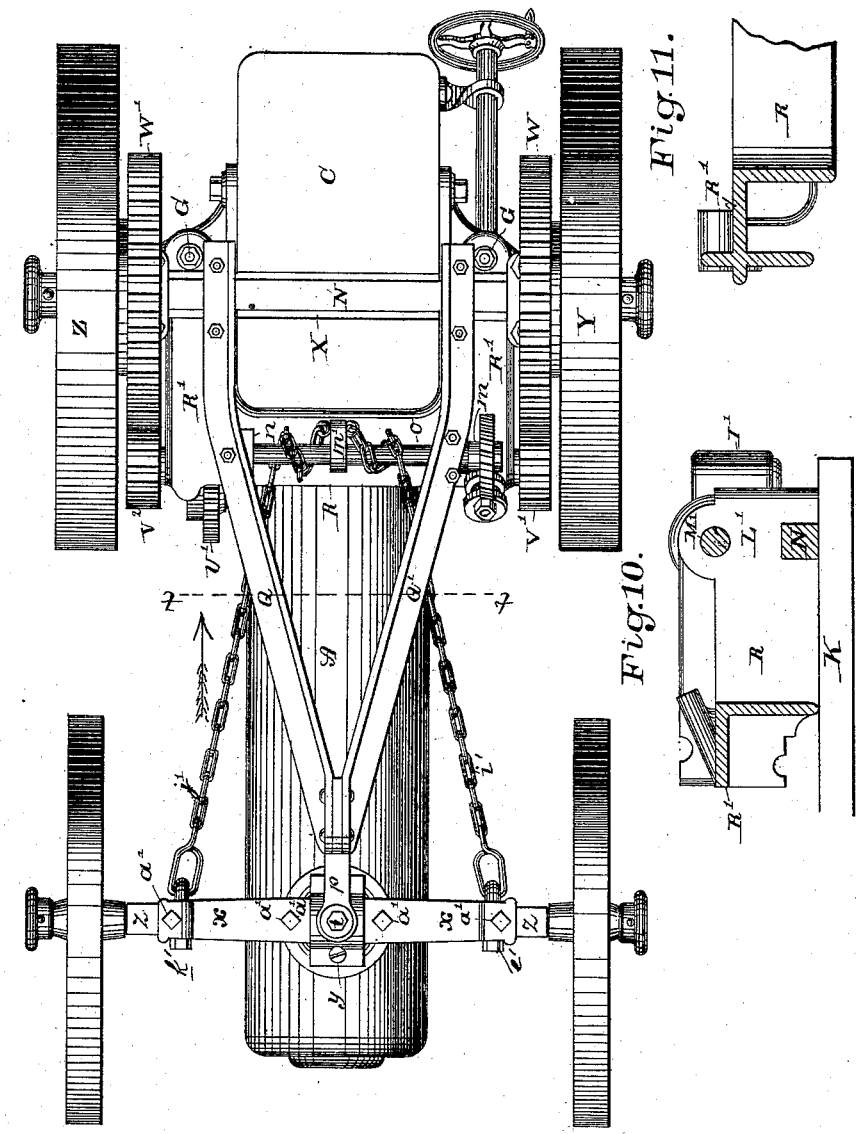
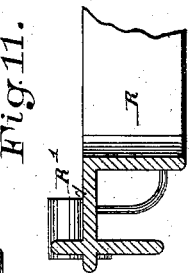
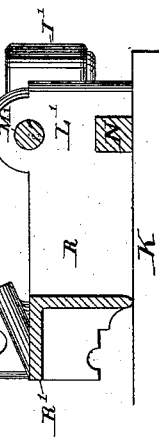
WITNESSES
F. H. Knight
F. C. Rose
INVENTOR
F. F. Landis
By H. S. Abbot
ATTORNEY.

(No Model.) 6 Sheets—Sheet 4.
F. F. LANDIS.
TRACTION ENGINE.
No. 268,808. Patented Dec. 12, 1882.
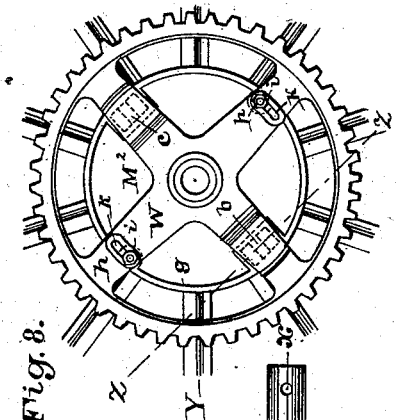
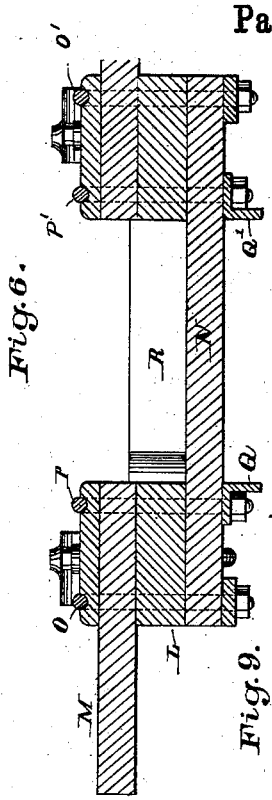
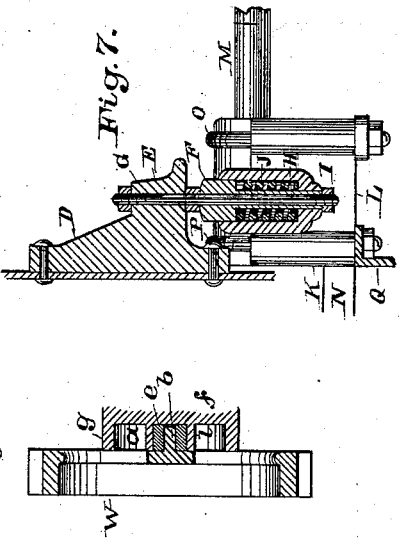
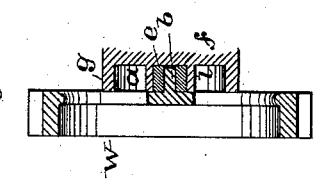
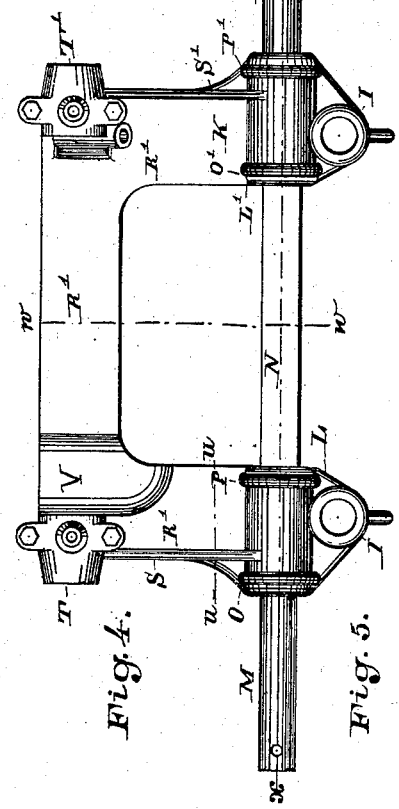
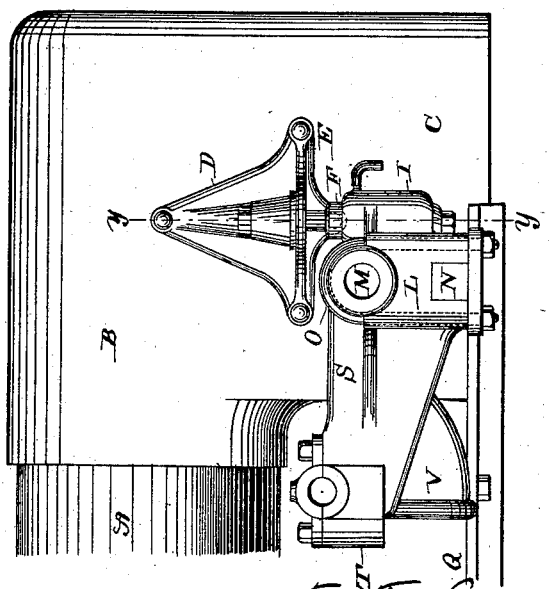
WITNESSES
F. H. Knight
F. C. Rose
F. F. Landis
INVENTOR.
By H. A. Abbot
ATTORNEY.

(No Model.)
F. F. LANDIS.
TRACTION ENGINE.
No. 268,808. Patented Dec. 12, 1882.
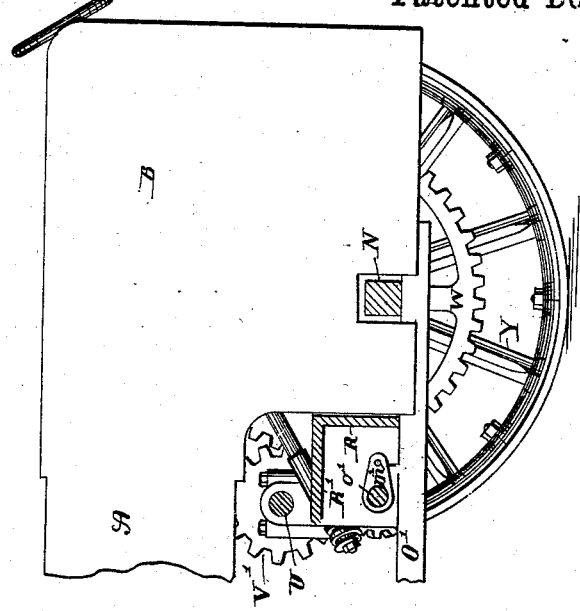
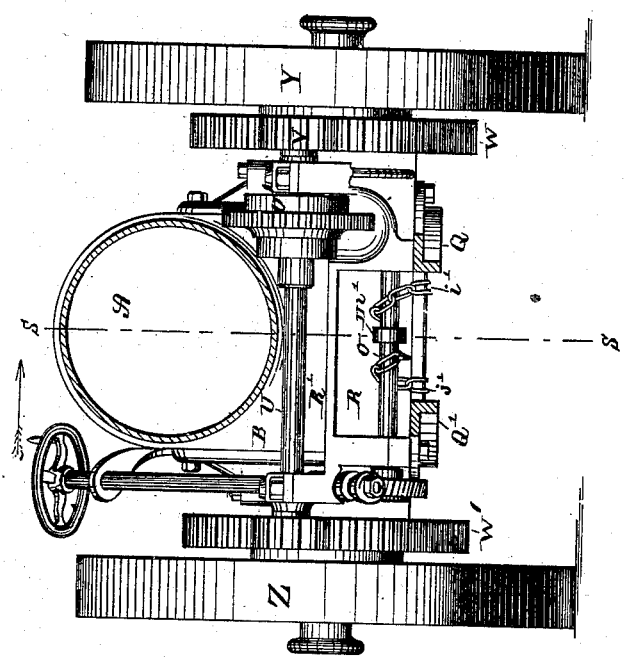
WITNESSES
F. H. Knight
F. C. Rose
F. F. Landis.
INVENTOR
By H. S. Abbot.
ATTORNEY (No Model.)  6 Sheets—Sheet 6.
F. F. LANDIS.
TRACTION ENGINE.
No. 268,808.  Patented Dec. 12, 1882.
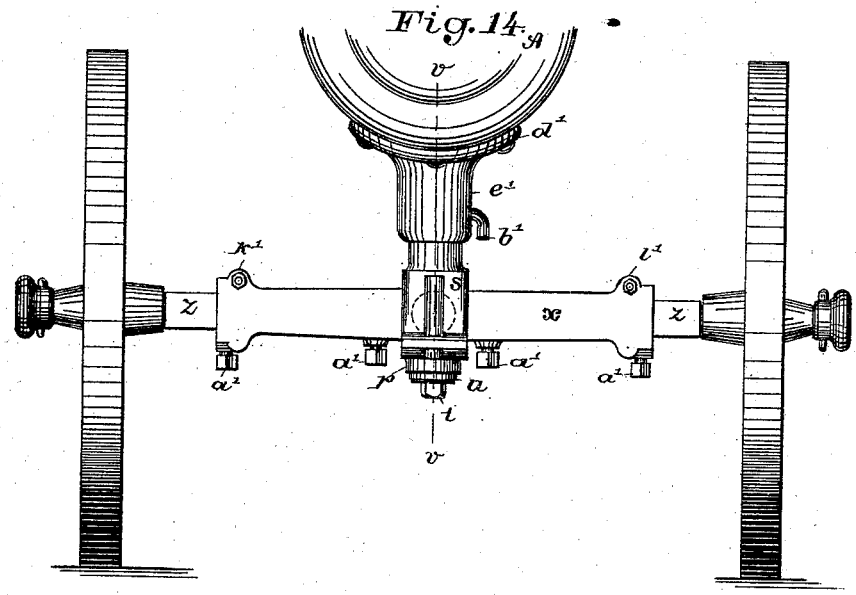
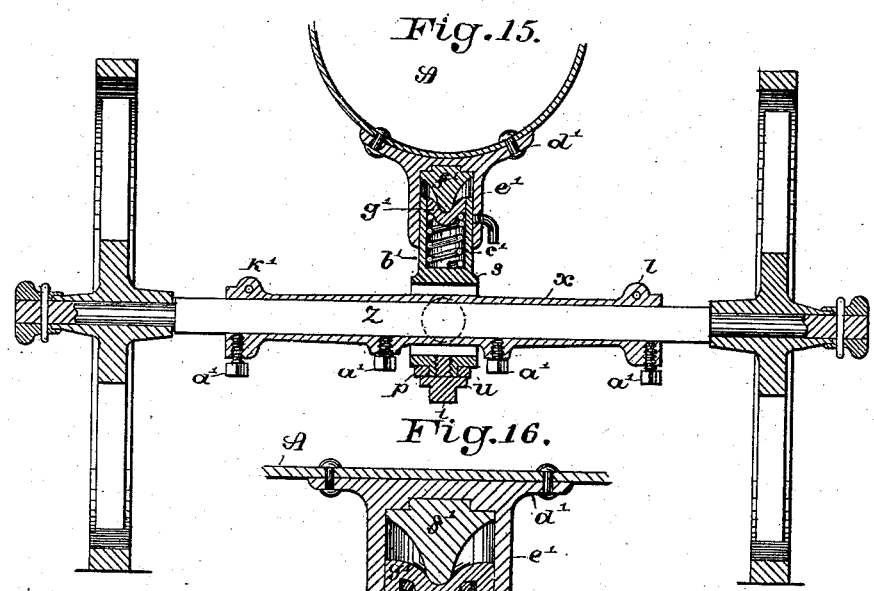
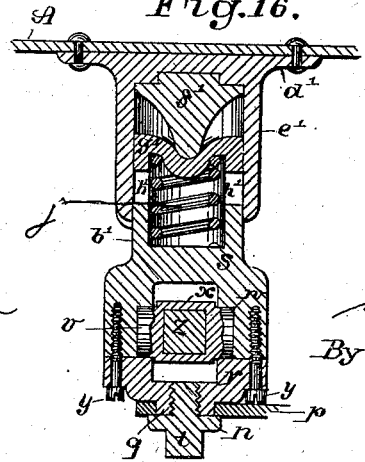
Attest:
Herm Lauter
F. H. Knight
Inventor:
F. F. Landis.
By H. J. Abbot.
Attorney.

UNITED STATES PATENT OFFICE.

FRANK F. LANDIS, OF WAYNESBOROUGH, PENNSYLVANIA.

TRACTION-ENGINE.

SPECIFICATION forming part of Letters Patent No. 268,808, dated December 12, 1882.

Application filed June 27, 1882. (No model.)

*To all whom it may concern:*

Be it known that I, FRANK F. LANDIS, a citizen of the United States of America, residing at Waynesborough, in the county of Franklin and State of Pennsylvania, have invented certain new and useful Improvements in Traction-Engines; and I do hereby declare the following to be a full, clear, and exact description of the invention, such as will enable others skilled in the art to which it appertains to make and use the same, reference being had to the accompanying drawings and letters and figures of reference marked thereon, which form a part of this specification, and in which—

Figure 1:
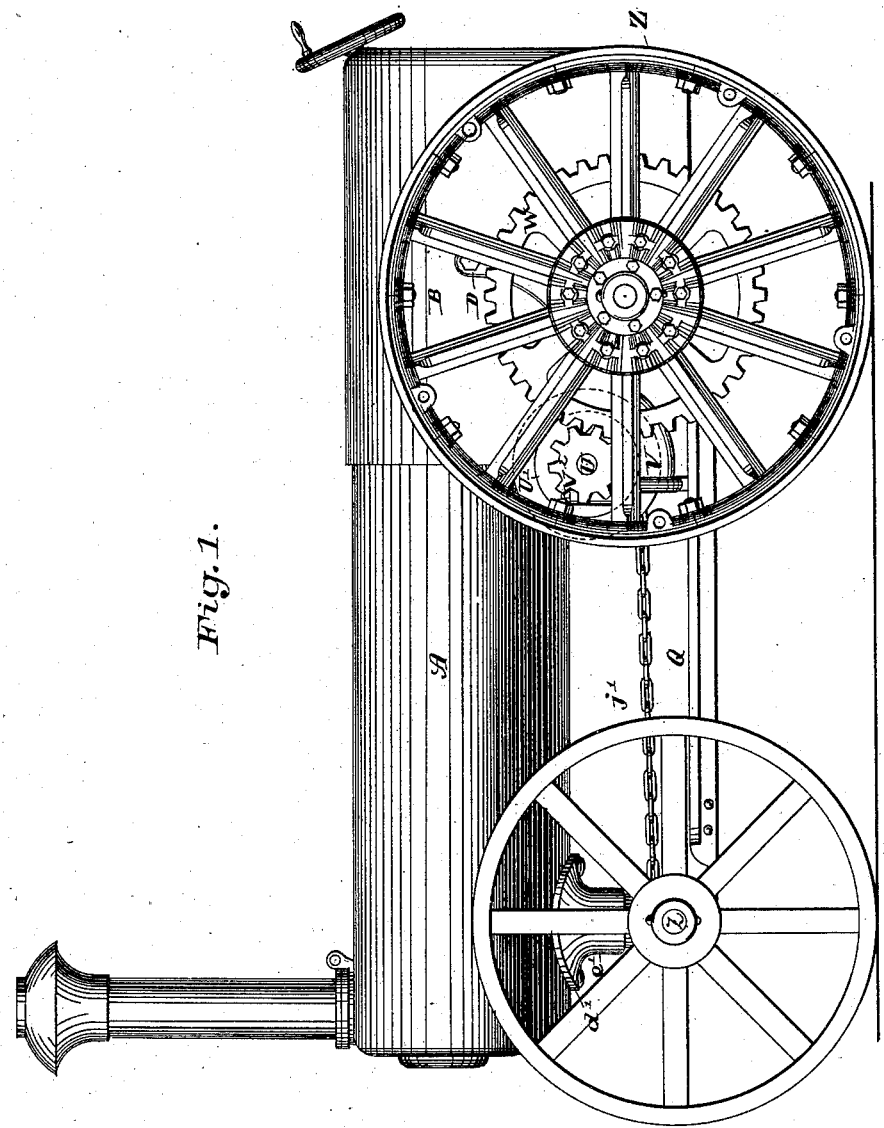
Figure 2:
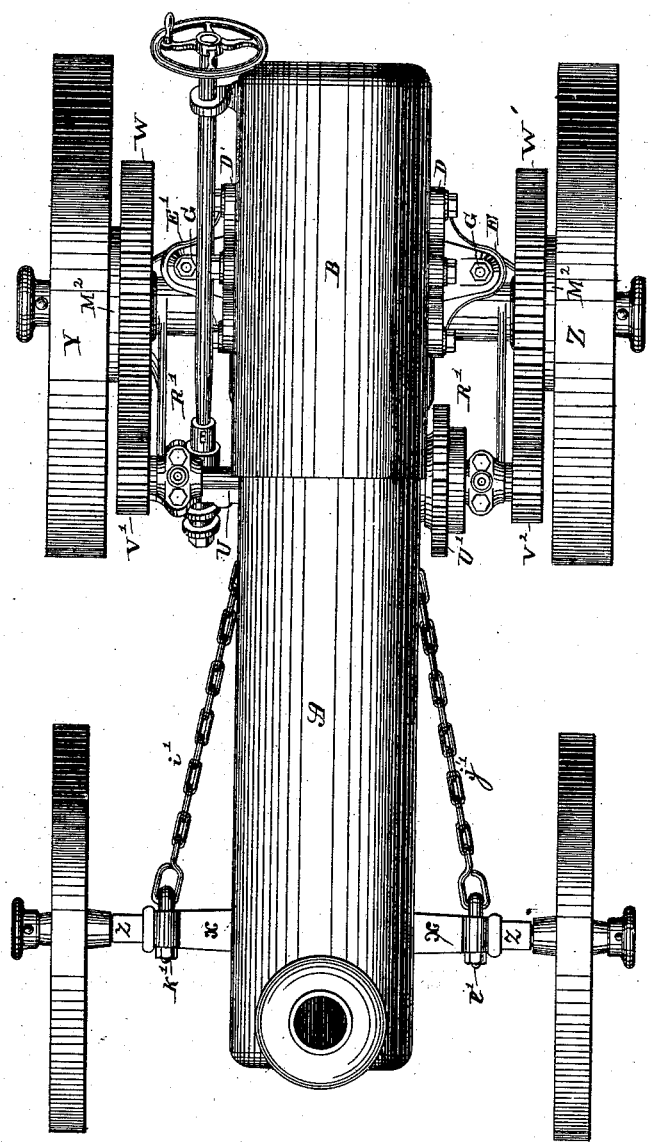

Figure 1 is a side elevation. Fig. 2 is a top view. Fig. 3 is a bottom view. Fig. 4 is a top view of the rear axle and part of the frame with the wheels, boiler, and engine removed. Fig. 5 is a side elevation of the rear end of the frame and axle secured to the fire-box. Fig. 6 is a vertical section taken upon the line $x\,x$ of Fig. 4. Fig. 7 is a vertical section taken upon the line $y\,y$ of Fig. 5. Fig. 8 is a side elevation of the driving gear-wheel, shown attached to the driving or traction wheel. Fig. 9 is an enlarged section taken on the line $z\,z$ of Fig. 8. Fig. 10 is a vertical section taken on the line $w\,w$ of Fig. 4. Fig. 11 is a vertical cross-section taken on the line $u\,u$ of Fig. 4. Fig. 12 is a vertical cross-section taken on the line $t\,t$ of Fig. 3, looking back. Fig. 13 is a vertical longitudinal section taken upon the line $s\,s$ of Fig. 12. Fig. 14 is a front view with the upper part of the boiler removed. Fig. 15 is a vertical cross-section with the upper part of the boiler removed, taken on a line passing through the hub of the front wheels. Fig. 16 is an enlarged vertical section taken upon the line $v\,v$ of Fig. 14.

A represents the boiler; B, the fire-box, and C the ash-pan. D and D are metal plates, bolted to the sides of the fire-box, and are provided with laterally-extending arms E and E', that form the support for sustaining the weight of the rear end of the boiler, engine, and fire-box upon the springs.

Each of the arms E and E' has a cylindrical spring-cap, F, of peculiar construction, secured to its under side by means of headed bolts G G passing from the top of the arms down through the center of the spring-cap and its attached tubes H to the under side of the tubular spring-seats I I, where they are secured by nuts. When required, one or more washers may be placed between the top of the cap and the under side of the arm E, to properly adjust the parts to the required position for their movement. The cylindrical spring caps cover the tops of and rest upon coiled springs J, that occupy and rest upon the bottoms of the tubular spring-seats, and bear the weight of parts attached to the arms E. The cylindrical spring-caps fit the tubular spring-seats neatly, and have tubes H either formed of the same piece of metal or rigidly secured and made of sufficient length to extend downward through the center of the coiled spring through the bottom of the spring-seat to the nut upon the end of the rod, which it envelops. The opening through the bottom of the seat has the proper length and diameter to form a bearing, which assists the cap in maintaining a true vertical movement upon the compression and expansion of the spring.

The spring-seats I and I, are secured to or may be cast as a part of the frame K, which is composed principally of two solid bodies of metal, L and L', at each side, and connecting parts passing under the boiler in front of the fire-box, preferably all cast in one piece of metal, and of as light weight as possible consistent with the strength required. The bodies L and L' receive the shanks of the spindles M and M' and the ends of the axles N, the latter being secured in a recess in each body by two straps, O and O', and P and P', that pass over the tops of the bodies, resting in grooves thereon, and passing down on either side of the bodies through cases forming a part of the bodies to their under sides, where the two ends of the outer straps, O and O', pass through a fish-plate and are secured by nuts, and the two ends of the inner straps, P and P', pass through the upper flange of an angle-iron, Q, and are secured by nuts. In a like manner the two ends of the outer strap O' extend to the bottom of the body and are secured by nuts beneath a plate, and the two ends of the inner strap P' pass through the upper flange of an angle-iron, Q', and are secured by nuts. The angle-irons Q and Q' extend forward in parallel lines to the front of the frame, which they sustain and to which they are secured by bolts. From this point forward they extend on converging lines, meeting just behind the front axle, forming the reach or coupling that connects the two axles. Immediately in front of the spring-seat and near the top of the bodies the shanks of the spindles M and M' are embedded in the bodies at the time of casting, or may be otherwise suitably secured.

The parts of the cast-metal frame K that connect the two bodies L and L' consist of an inner vertical flange, R, of any suitable thickness, that extends from the body L forward to the front end of the fire-box and across under the boiler to the opposite corner of the fire-box and back to the body L'. This flange may be of any suitable width, but preferably extends from the height of the spindles to the bottom of the fire-box, and its sides rest on the angle-irons Q and Q'. A flange, R', of any suitable width or thickness, extends outward in a horizontal line from the top of the flange R, and its outer edges are braced and tied at the sides of the frame by strengthening-ribs above and below, extending from the bodies L and L', the upper ribs, S and S', terminating in an increased quantity of metal at T and T' for receiving the bearings of the shaft U of the compensation-gear U', through which the power of the engine is transmitted.

A recess or depression, V, is provided in the frame K in the left-hand front corner to make room for the location of the compensation-gear at that point, and permit its shaft to pass under the boiler from pinion V' to pinion V², which engage with the driving gear-wheels W and W'.

In the construction of the fire-box a recess, X, is made, open at the bottom and extending upward any required distance, to receive the axle and provide for the vertical movement of the boiler and fire-box upon the contraction and expansion of the spring J, the stationary spindles M and M' receiving the hubs M² of the wheels Y and Z. The hubs of these wheels each carry inside of the wheel driving gear-wheels W and W', that mesh with and receive power from the pinions V' and V². The driving gear-wheels are loose upon the hubs, and are each secured to the back face, a, of their respective hubs by means of two pulling-lugs, b and c, that enter two pockets on the face a of the hub between two compressible rubber spring-blocks, e and f, which serve to diminish shocks received by the traction-wheel, and thus protect the cogged gearing. The face a is provided with an annular flange, g, against which the driving gear-wheel is held by bolts h, passing from the face a through slots i and receiving nuts k, which cover the side of the slot. The slots should be of sufficient length and circular in form to clear the bolts upon the movement of the wheel consequent upon the power of the engine being developed upon the elastic blocks e and f, that are preferably made of rubber, but may be made of any other suitable material.

In constructing a wheel of this form of traction-engine the hub is preferably composed of two annular cast-iron plates, of any required diameter, embracing the spokes of the wheel. The pockets or "spring-boxes," as they may be called, are formed by extending a flange, l, from and with equal height with the annular flange g around three sides of the space required to hold the blocks back to the flange g.

Beneath the flange R', and in front of the flange R, in front of the frame, are secured the bearings m and n of the steering-shaft o, which is provided on one end with a worm-gear and rod leading to the back end of the fire-box, where it is provided with a crank for the use of the engine-driver. At their front ends the angle-irons Q and Q' are bolted together, clamping an eyebolt, p, which is held upon a stud or boss, q, which acts as a king-bolt and forms the lower end of the cap r of the boxes, to which it is secured by a screw, t, provided with a flange, u. The box s is provided with bearings for the trunnions v w of the axle-sleeve x. The recess for receiving the axle-sleeve is partly in the bearing and partly in the cap, and is rectangular in form, so as to allow of the vertical play of each end of the axle. The bearings for the trunnions are made in the box s, and are closed by the cap r, which is held to the box by tap-bolts y y. The sleeve x has a square opening through its center, through which the axle z passes, and is held to its place by a series of set-screws, a', which pass through the bottom of the sleeve and press against the bottom of the axle, thereby preventing its movement within the sleeve. Instead of the rectangular sleeve x shown in the drawings, a top cap or plate held to the axle by suitable clamping devices or a top cap or plate with flanges extending down either side of the axle for any desired distance and held to the axle by suitable clamping devices may be used. By the use of the sleeve, as above described, the full unbroken strength of the metal axle is obtained.

The box s terminates at its upper end in a cylindrical spring-case, b', inclosing a coiled spring, c', carrying the whole weight which is placed on the front axle. The weight is placed upon the spring by means of a saddle, d', shaped to fit and riveted or bolted to the under side of the front part of the boiler, and provided with a dependent cylinder, e', for covering and partially inclosing the spring-case b'. In the top of the cylinder e' is fitted a conical centering-pin, f', that rests in the saddle g', that sets upon the spring c', and has the required amount of vertical play provided for by the slots h'. By this form of construction the engine resting upon the spring c' and trunnions v w is relieved from immediate danger to its gearing from the contact of its front wheels with any ordinary obstruction on the road.

The front end of the steering-chains $i'$ and $j'$ are secured to eyebolts fastened to the lugs $k'$ and $e'$ of the sleeve $x$, and extend on converging lines to the center of the steering-shaft $o$, around which they are wound and secured to the collar $m'$.

Having thus described my invention, I claim as new and desire to secure by Letters Patent—

1. A cast-metal frame for a traction-engine, consisting of the flanges R and R', terminating in bodies of metal L and L', substantially as shown and described.

2. A cast-metal frame for a traction-engine consisting of the flanges R and R' and bodies L and L', provided with tubular spring-seats I and I, substantially as shown and described.

3. The combination, substantially as set forth, of the axle N, bodies L and L', spindles M and M', and suitable straps for holding the axle, all arranged and operating to produce an open space between the bodies L and L' for the reception of the fire-box.

4. The combination, substantially as set forth, of the tubular spring-seat I and spring J with the cap F, tube H, and bolt G.

5. The combination of the frame consisting of the bodies L and L', flanges R and R', with the shaft U, compensation-gear U', pinions V' and V², and driving gear-wheels W and W', substantially as shown and described.

6. The metal plates D, having laterally-extending arms E, in combination with spring-seats I, spring J, cap F, tube H, and bolt G, substantially as and for the purpose shown and described.

7. The hub of the driving-wheel having an annular flange, $g$, and flanges $l$, extending in from the flange $g$ and forming pockets for receiving the rubber blocks $e$ and pulling-lugs of the driving gear-wheel, in combination with the driving gear-wheel, having pulling-lugs fitting in between the rubber blocks in the pockets of the hub, said driving gear-wheel being secured to the hub by the bolts $h$, working in slots $i$, substantially as and for the purpose shown and described.

8. The box $s$ for supporting the front end of a traction-engine, resting upon the trunnions $v$ $w$ of the sleeve $x$, surrounding the axle $z$, substantially as shown and described.

9. A box, $s$, having bearings for trunnions and cap $r$, in combination with sleeve $x$, inclosing the axle $z$ and having trunnions $v$ $w$ cast on said sleeve, whereby a vertical play of the ends of the axle is allowed, substantially as and for the purpose shown and described.

10. A box, $s$, having the cylindrical spring-case $b'$, spring $j$, flanged saddle $g'$, inclosing the top of spring $j$ and depressed in the middle to center the pin $f'$, in combination with the cap $d'$ and pin $f'$, set in said cap, substantially as shown and described.

11. A box, $s$, in combination with a sleeve, $x$, provided with trunnions $v$ $w$, a cap, $r$, a bolt, $t$, and the end of the reach, substantially as shown and described.

12. A sleeve or cap, $x$, surrounding the front axle of a traction-engine, fastened to said axle by the screws $a'$, and cast with trunnions $v$ $w$, substantially as shown and described.

In testimony whereof I affix my signature in the presence of two witnesses.

F. F. LANDIS.

Witnesses:
 H. W. CRAGIN,
 F. H. KNIGHT.